US009913195B2

United States Patent
Petersen et al.

(10) Patent No.: US 9,913,195 B2
(45) Date of Patent: Mar. 6, 2018

(54) MESH PATH SELECTION

(71) Applicant: TerraNet AB, Lund (SE)

(72) Inventors: Johan Petersen, Malmö (SE); Henrik Floberg, Lund (SE); Monthadar Al Jaberi, Malmö (SE); Chafik Driouichi, Malmö (SE)

(73) Assignee: TERRANET AB, Lund (SE)

( * ) Notice: Subject to any disclaimer, the term of this patent is extended or adjusted under 35 U.S.C. 154(b) by 155 days.

(21) Appl. No.: 14/744,367

(22) Filed: Jun. 19, 2015

(65) Prior Publication Data

US 2016/0373997 A1    Dec. 22, 2016

(51) Int. Cl.
*H04W 40/12*    (2009.01)
*H04W 72/04*    (2009.01)
(Continued)

(52) U.S. Cl.
CPC ....... *H04W 40/12* (2013.01); *H04W 72/0406* (2013.01); *H04L 45/021* (2013.01);
(Continued)

(58) Field of Classification Search
CPC ............. H04W 40/12; H04W 72/0406; H04W 40/246; H04W 84/18; H04L 45/021; H04L 45/16; H04L 45/22
(Continued)

(56) References Cited

U.S. PATENT DOCUMENTS 6,535,504 B1    3/2003    Johnson et al.
8,199,655 B2    6/2012    Kakadia et al.
(Continued)

FOREIGN PATENT DOCUMENTS

CN    101242320 A    8/2008
CN    101494590 A    7/2009
(Continued)

OTHER PUBLICATIONS

International Search Report and Written Opinion of PCT/EP2016/063679 dated Oct. 24, 2016, all enclosed pages cited.

*Primary Examiner* — Charles C Jiang
*Assistant Examiner* — Wali Butt
(74) *Attorney, Agent, or Firm* — McNair Law Firm, P.A.

(57) ABSTRACT

A mesh network comprising an originator station and a target station wherein each station comprises a controller and memory for storing a first path table for storing one or more paths to be used for sending data packets and a second path table for storing one or more alternative paths for sending data packets. The originator station is configured to broadcast a path request data packet for the target station and receive a first path reply data packet comprising a first alternative path to the target station.

Then the originator station is further configured to store the first alternative path in the second path table of the originator station and receive at least one second path reply data packet comprising at least one second alternative path to the target station.

Then the originator station is further configured to retrieve a best path, based on one or more signal parameters pertaining to each path, to the target station from the second path table of the originator station, store the best path to the target station in the first path table of the originator station and use the best path for sending data packets to target station.

An originator station, an intermediate station and a target station in a mesh network is also disclosed. As well is a method of a station in a mesh network and a computer program product.

19 Claims, 6 Drawing Sheets

(51) Int. Cl.
  *H04W 40/24* (2009.01)
  *H04W 84/18* (2009.01)
  *H04L 12/755* (2013.01)
  *H04L 12/707* (2013.01)
  *H04L 12/761* (2013.01)

(52) U.S. Cl.
  CPC .............. *H04L 45/16* (2013.01); *H04L 45/22* (2013.01); *H04W 40/246* (2013.01); *H04W 84/18* (2013.01)

(58) Field of Classification Search
  USPC ....... 370/252, 255, 236, 238, 242, 331, 338; 375/133; 455/456.6
  See application file for complete search history.

(56) References Cited

U.S. PATENT DOCUMENTS

| | | |
|---|---|---|
| 2002/0186682 A1 | 12/2002 | Kawano et al. |
| 2009/0180400 A1 | 7/2009 | Chiabut et al. |
| 2009/0180482 A1 | 7/2009 | Andreoletti et al. |
| 2010/0027517 A1* | 2/2010 | Bonta ................ H04L 12/5695 370/338 |
| 2010/0232300 A1 | 9/2010 | Kashima |
| 2012/0087235 A1 | 4/2012 | Smith et al. |
| 2012/0157128 A1* | 6/2012 | Aust ..................... H04W 64/00 455/456.6 |
| 2012/0275490 A1* | 11/2012 | Courtice ............. H04W 40/246 375/133 |
| 2013/0107909 A1* | 5/2013 | Jones .................... H04B 1/715 375/133 |
| 2013/0215739 A1 | 8/2013 | Zhang |
| 2014/0029446 A1 | 1/2014 | Loher |
| 2014/0092910 A1 | 4/2014 | Valentine |
| 2014/0112171 A1 | 4/2014 | Pasdar |
| 2014/0269393 A1* | 9/2014 | Banerjea ................ H04L 45/26 370/252 |
| 2015/0030016 A1 | 1/2015 | Larkin |
| 2015/0109958 A1 | 4/2015 | Zhou et al. |
| 2015/0382275 A1* | 12/2015 | Pragada ............... H04W 40/12 370/236 |

FOREIGN PATENT DOCUMENTS

| | | |
|---|---|---|
| CN | 102056209 A | 5/2011 |
| CN | 103248571 A | 8/2013 |
| EP | 2302840 A1 | 3/2011 |
| JP | 2005-252856 A | 9/2005 |
| WO | 2013/000507 A1 | 1/2013 |
| WO | 2014/035312 A2 | 3/2014 |

* cited by examiner

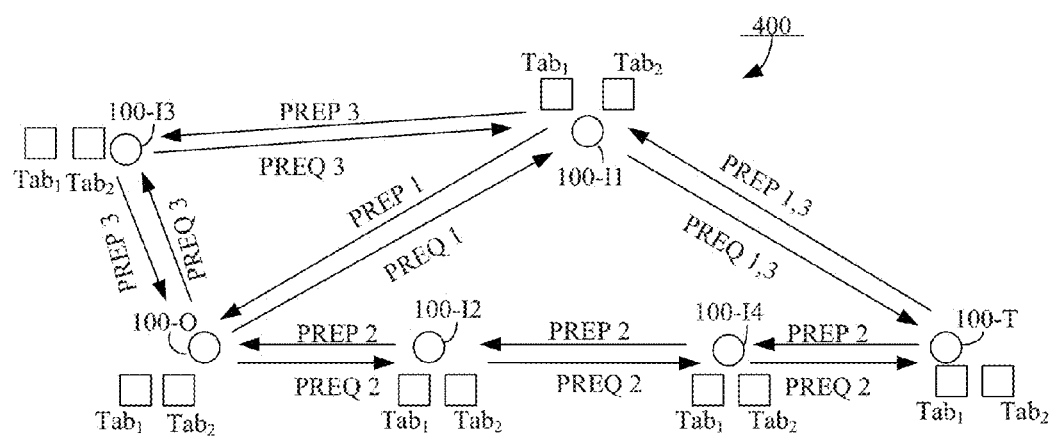
FIG. 4
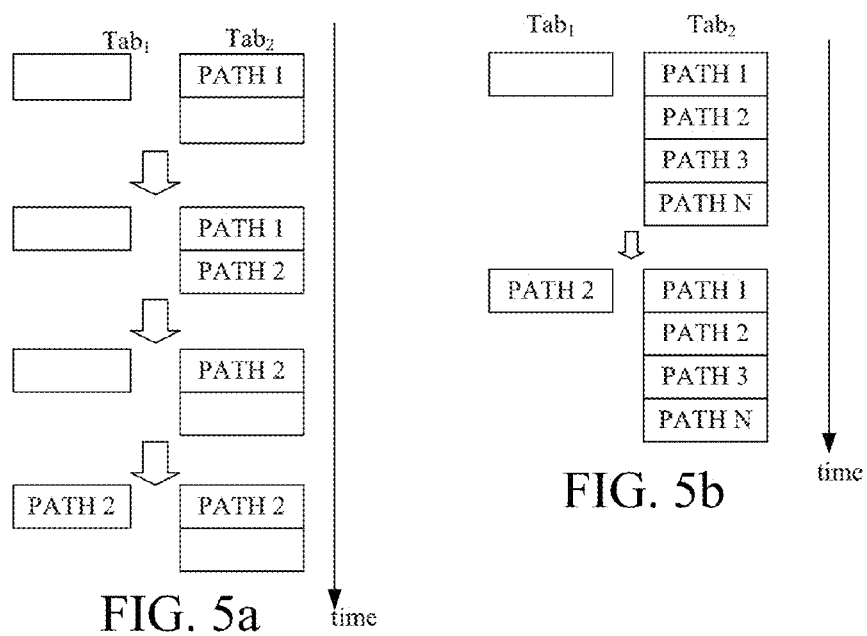
FIG. 5a
FIG. 5b

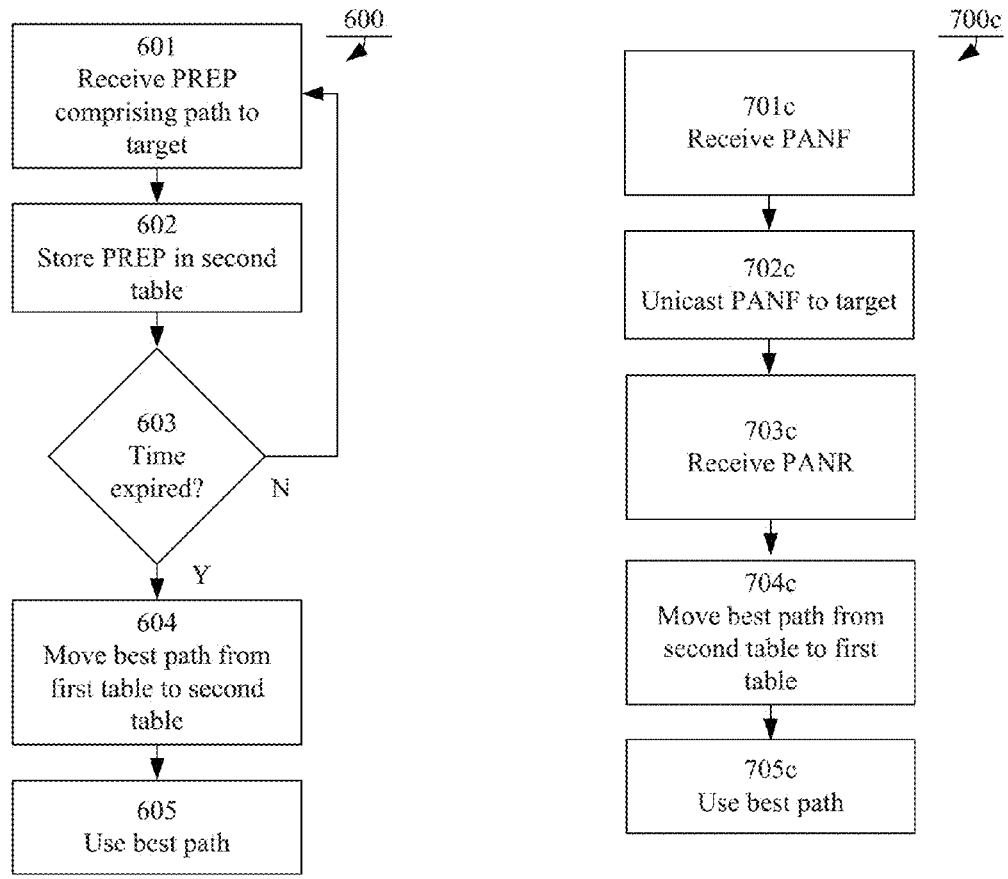
FIG. 6
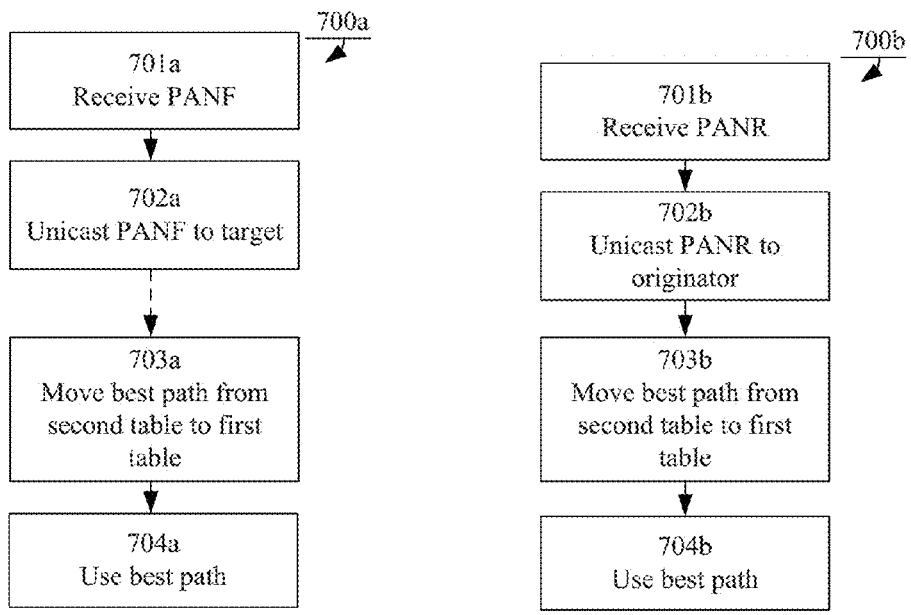
FIG. 7c
FIG. 7a
FIG. 7b

MESH PATH SELECTION

TECHNICAL FIELD

The present invention relates generally to mesh network communication. More particularly, it relates to updating a path in a mesh network.

BACKGROUND

In mesh network there is no base station to organize communication between network nodes. Instead, all nodes, or stations, typically use each other's knowledge about surrounding stations in order to communicate. For example if a first station wishes to communicate with a second station but does not know which path should be used to reach the second station, the first station will typically broadcast a data packet comprising a path request (PREQ) for the second station.

The broadcasted data packet will be received by neighboring stations to the first station. The neighboring stations typically determine if the PREQ is addressed to them, and if such is not the case, broadcast it further to other neighboring stations.

This procedure is typically repeated until the second station receives the PREQ and finds its own address in it. Upon determining that the PREQ has found its target, the second station replies by sending a unicast path reply (PREP) to the first station which follows the path the PREQ took to reach the second station in reverse.

Since mesh networks typically are dynamic with stations entering and leaving the network frequently and/or moving around within the mesh network changing their positions, and thereby also the topology of the mesh network, the PREQ/PREP routine is periodically updated and new PREQs/PREPs are sent out.

Since the stations in the mesh network typically are mobile, stations that recently found themselves in areas with good signal quality may suddenly find themselves in areas with bad reception. This may typically lead to that a path using these stations as links may comprise one or more bad links which affects the overall throughput.

To prevent links from breaking, the paths are regularly updated. According to IEEE802.11s/IEEE802.11 Mesh, path requests are broadcasted regularly (e.g. every 5 seconds), and as a PREP is received for each other station indicating a path to that station, that path is used until the next path request is issued. However, as this path may not be the best path, packet loss may occur when using it.

Because of the periodic update of the PREQ/PREP, reactions to bad or broken links may typically be too slow, which results in packet loss.

SUMMARY

It should be emphasized that the term "comprises/comprising" when used in this specification is taken to specify the presence of stated features, integers, or components, but does not preclude the presence or addition of one or more other features, integers, components, or groups thereof.

It is an object of some embodiments to overcome or mitigate at least some of the above disadvantages and to provide a mesh network, an originator station of a mesh network, an intermediate station for a mesh network, a target station of a mesh network, a method for a station in a mesh network as well as a computer program product that, when executed, performs the method steps according to this disclosure.

According to a first aspect, this is achieved by a mesh network comprising an originator station and a target station. Each station comprises a controller and memory for storing a first path table for storing one or more paths to be used for sending data packets and a second path table for storing one or more alternative paths for sending data packets. The originator station is configured to broadcast a path request data packet for the target station and receive a first path reply data packet comprising a first alternative path to the target station. Then the originator station stores the first alternative path in the second path table of the originator station and receives at least one second path reply data packet comprising at least one second alternative path to the target station. The originator station retrieves a best path, based on one or more signal parameters pertaining to each path, to the target station from the second path table of the originator station, stores the best path to the target station in the first path table of the originator station and uses the best path for sending data packets to target station.

In some embodiments the best path is determined by comparing the one or more signal parameters of the received second alternative path to the one or more signal parameters of the stored first alternative path to determine the best alternative path.

If the second alternative path is determined to be the best alternative path, the second alternative path is stored in the second table overwriting the first alternative path.

In some embodiments said controller is further configured to store the at least one second alternative path to the target station in the second path table without overwriting the first alternative path.

The best path is retrieved by comparing the one or more signal parameters of the stored second alternative path to the one or more signal parameters of the stored first alternative path to determine the best alternative path.

If the second alternative path is determined to be the best alternative path, the second alternative path is retrieved from the second table.

If not, the first alternative path is retrieved.

The one or more signal parameters which is, or are, used for determining the best path to the target station may be one or more of a Signal to Noise Ratio (SNR), Received Signal Strength Indicator (RSSI) for peer mesh station, path delay time, packet loss and/or packet error rate.

Jitter may also be used to determine the quality of the received paths to the target station.

In some embodiments the mesh network further comprises one or more intermediate stations comprising a controller and a memory for storing a first path table for storing one or more paths to be used for sending data packets and a second path table for storing one or more alternative paths for sending data packets. The originator station is further configured to receive the first path reply data packet comprising a first alternative path to the target station via a first intermediate station and store the first alternative path to the target station in the second path table of the originator station. Then the originator station receives a second path reply data packet comprising a second alternative path to the target station via a second intermediate station and stores the second alternative path to the target station in the second path table of the originator station. The originator station retrieves a best path, based on one or more signal parameters, to the target station from the second path table of the originator station, stores the best path to the target station in the first path table of the originator station and uses the best path for sending data packets to the target station.

In some embodiments, the intermediate station pertaining to the best path is further configured to receive a path acknowledgement forward data packet, forward by unicast the path acknowledgement forward packet to the target station and receive a path acknowledgement return data packet from the target station. The intermediate station pertaining to the best path is then configured to update the first path table of the intermediate station to comprise the best path to the target station, forward the path acknowledgement return data packet to the originator station and use the best path stored in the first path table of the intermediate station to transmit data packets between the originator station and the target station.

In some embodiments the first path table of the originator station is at least updated after a first time period (T), and wherein the first and second path request data packets are received and consequently where the second path table of the originator station is updated at least once during a second time period (t) at the end of and partly overlapping the first time period (T).

In some embodiments, the first path table may be updated periodically, triggering a new PREQ at least once shortly before each periodic update.

In some embodiments, wherein if during the first time period, before the second time period is initiated a path to be used to the target station is broken, the originator station is further configured to broadcast the second path request data packet for the target station.

In some embodiments, the path request data packet comprises a weak path indicator for indicating the condition of a link between two stations which the path request data packet transverse on its way from the originator station to the target station. The target station comprises a weak path indicator counter for evaluating if the path used by the path request data packet to reach the target station is suitable for the path reply data packet or if a second path request data packet should be issued from the target station to the originator station. The controller of the target station comprises a throttling element for throttling or increasing the path request data packet rate.

In some embodiments, the controller of the target station is further configured to compare the number of received weak path indicators indicating an integer greater than 1 to an upper throttle threshold value. If the number of received weak path indicators indicating an integer greater than 1 exceeds the upper threshold value, the controller is further configured to increase the path request data packet rate in a non linear fashion. If the number of received weak path indicators indicating an integer greater than 1 is less than a lower throttle threshold value, the controller of the target station is further configured to decrease the path request data packet rate in a non linear fashion.

The non linear fashion may for example be exponential. For example, if stations are rapidly entering and exiting the mesh network the risk of dropping data packets is high. A rapidly changing mesh network due to e.g. arriving and departing stations will typically lead to that several received packets at the target station indicates value 2 or worse. An exponential increase in the rate of which PREQs are transmitted ensures finding better paths quicker while still avoiding collisions due to increased network traffic. The exponential increase ensures that the rate of PREQs is only increased rapidly after it is determined that the network is subjected to substantial changes in topology (several received data packets indicates a value >1) and not to single events.

In some embodiments non linear fashion is stepwise.

The weak path indicator may in some embodiments indicate integers from 0-3. Wherein 0 indicates a good path, 1 indicates a weak path, 2 indicates a bad path and 3 indicates an unreliable path.

For each received path request data packet, if the integer pertaining to the weak path indicator of the received path request data packet is >0, the weak path indicator counter of the target station is incremented with an integer number corresponding to the integer pertaining to the weak path indicator of the received path request data packet.

If the integer pertaining to the weak path indicator of the received path request data packet is equal to 0, the weak path indicator counter is decreased with 1.

According to a second aspect a mesh network station being an originator station comprising a controller and a memory for storing a first path table for storing one or more paths to be used for sending data packets and a second path table for storing one or more alternative paths for sending data packets is or are provided.

The originator station is further configured to broadcast a first path request data packet for the target station and receive a first path reply data packet comprising a first alternative path to the target station. The originator station stores the first alternative path in the second path table of the originator station and receives at least one second path reply data packet comprising at least one second alternative path to the target station. Then the originator station retrieves a best path based on one or more signal parameters to the target station from the second path table of the originator station, stores the best path to the target station in the first path table of the originator station and uses the best path for sending data packets to target station.

A third aspect is a mesh network station being a target station comprising a controller and a memory for storing a first path table for storing one or more paths for sending data packets and a second path table for storing one or more alternative paths to be used for sending data packets.

The station is further configured to receiving a path request data packet from an originator station, transmitting by unicast a path reply data packet and receiving a path acknowledgement forward data packet comprising a best path based on one or more signal parameters for sending data packets between the originator station and the target station.

The station is further configured to update the first path table of the target station to comprise the best path for sending data packets between the originator station and the target station and transmitting by unicast a path acknowledgement return data packet to the originator station.

A forth aspect is a mesh network station being an intermediate station comprising a controller and a memory for storing first path table for storing one or more paths for sending data packets, and a second path table for storing one or more alternative paths for sending data packets.

The station is further configured to relay by broadcast a path request data packet from an originator station to a target station, relay by unicast a path reply data packet from the target station to the originator station and receive a path acknowledgement forward data packet comprising a best path based on one or more signal parameters for sending data packets between the originator station and the target station.

The intermediate station is further configured to transmit by unicast the path acknowledgement forward data packet to the target station, receive a path acknowledgement return data packet from the target station, update the first path table of the intermediate station to comprise the best path for sending data packets between the originator station and the target station and transmitting by unicast the path acknowledgement return data packet to the originator station.

The originator station is then configured to use the best path stored in the first path table of the intermediate station to transmit data packets between the originator station and the target station.

A fifth aspect is a method of a mesh network station in a mesh network comprising an originator station and a target station wherein each station comprises controller and a memory for storing a first path table for storing one or more paths for sending data packets and a second path table for storing one or more alternative paths for sending data.

The method comprises broadcasting by the originator station a first path request data packet for the target station, receiving a first path reply data packet comprising a first alternative path to the target station. The method further comprises retrieving a best path based on one or more signal parameters to the target station from the second path table of the originator station, storing the best path to the target station in the first path table of the originator station and using the best path for sending data packets to target station.

A sixth aspect is a computer program product comprising a computer readable medium, having thereon a computer program comprising program instructions, the computer program being loadable into a data-processing unit and adapted to cause the data-processing unit to execute the method according to the fifth aspect when the computer program is run by the data-processing unit.

An advantage of some embodiments is that the risk of losing data packets due to inadequate path choices is mitigated.

Another advantage of some embodiments is that the level of traffic in a mesh network is lowered.

Another advantage of some of the embodiments is that reliable network traffic is achieved.

BRIEF DESCRIPTION OF THE DRAWINGS

Further objects, features and advantages will appear from the following detailed description of embodiments, with reference being made to the accompanying drawings, in which:

FIG. 4 is a schematic view of communication in a general mesh network according to some embodiments;

FIGS. 5a and 5b illustrates a schematic drawing of a path table according to some embodiments;

FIG. 6 is a block diagram illustrating an example method according to some embodiments;

FIG. 7a, 7b, 7c each illustrates a block diagram of an example method according to some embodiments;

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figures 1A, 1B:
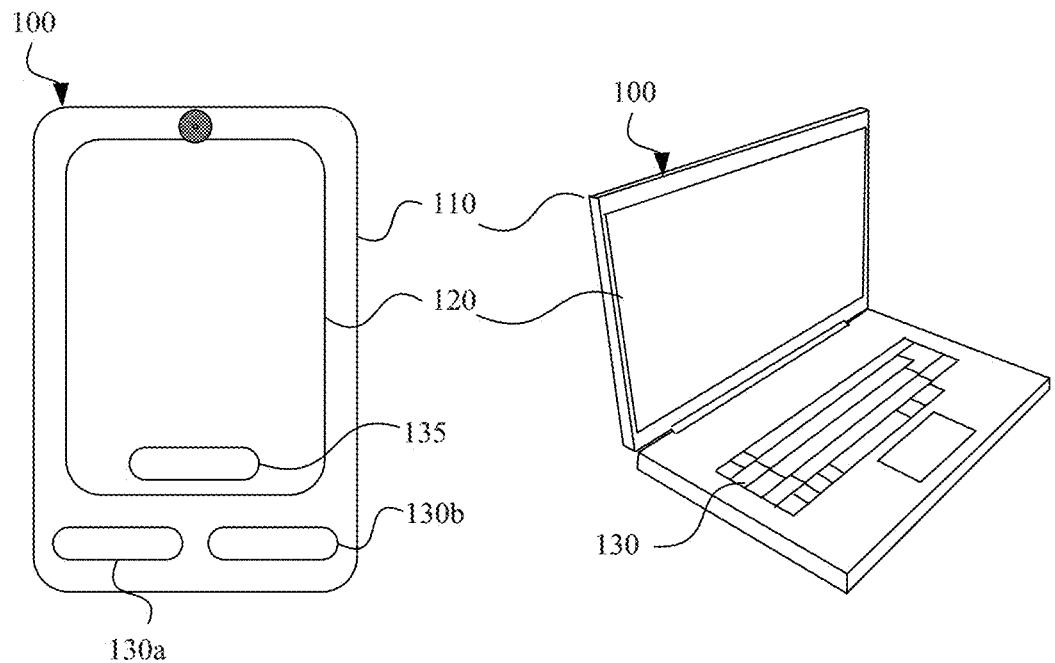
FIGS. 1a and 1b each illustrates a schematic drawing of a station according to some embodiments.

FIGS. 1a and 1b generally show a station 100 according to an embodiment herein. In one embodiment the station 100 is configured for wireless or radio frequency network communication for acting as a node in a mesh network. An example of a mesh network will be described with reference to FIG. 3. Examples of such a station 100 are: a personal computer, desktop or laptop, a tablet computer, a mobile telephone, a smart phone and a personal digital assistant.

Two embodiments will be exemplified and described as being a smartphone in FIG. 1a and a laptop computer 100 in FIG. 1b.

Referring to FIG. 1a, a smartphone 100 comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 are dependant on the design of the smartphone 100 and an application that is executed on the smartphone 100.

Referring to FIG. 1b, a laptop computer 100 comprises a display 120 and a housing 110. The housing comprises a controller or CPU (not shown) and one or more computer-readable storage mediums (not shown), such as storage units and internal memory. Examples of storage units are disk drives or hard drives. The station 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a station 100 to connect with other stations or a server.

The station 100 further comprises at least one input unit such as a keyboard 130. Other examples of input units are computer mouse, touch pads, touch screens or joysticks to name a few.

Figure 2:
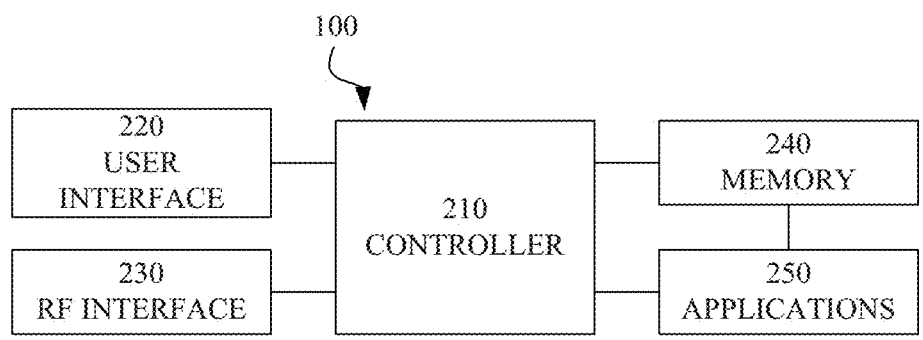
FIG. 2 is a schematic view of the components of a station according to some embodiments.

FIG. 2 shows a schematic view of the general structure of a station according to FIGS. 1a and 1b. The station 100 comprises a controller 210 which is responsible for the overall operation of the station 100 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the station 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the station 100. The software modules include a real-time operating system, drivers for a user interface, an application handler as well as various applications 250. The applications are sets of instructions that when executed by the controller 210 control the operation of the station 100. The applications 250 can include a messaging application such as electronic mail, a browsing application, a media player application, as well as various other applications 250, such as applications for voice calling, video calling, document reading and/or document editing, an instant messaging application, a calendar application, a control panel application, one or more video games, a notepad application, Short Message Service applications, location finding applications, electronic mailing and internet browsing applications.

The station 100 may further comprise a user interface 220, which in the station of FIGS. 1a and 1b is comprised of the display 120 and the keys 130, 135.

The station 100 further comprises a radio frequency interface 230, which is adapted to allow the station to communicate with other devices via a radio frequency band through the use of different radio frequency technologies. Examples of such technologies are IEEE 802.11, IEEE 802.11s, IEEE 802.11 Mesh and Bluetooth® to name a few. Other examples of radio technologies for example for communicating with devices outside the mesh network that may be implemented in a station 100 are W-CDMA, GSM, UTRAN, LTE, NMT to name a few.

Figure 3:
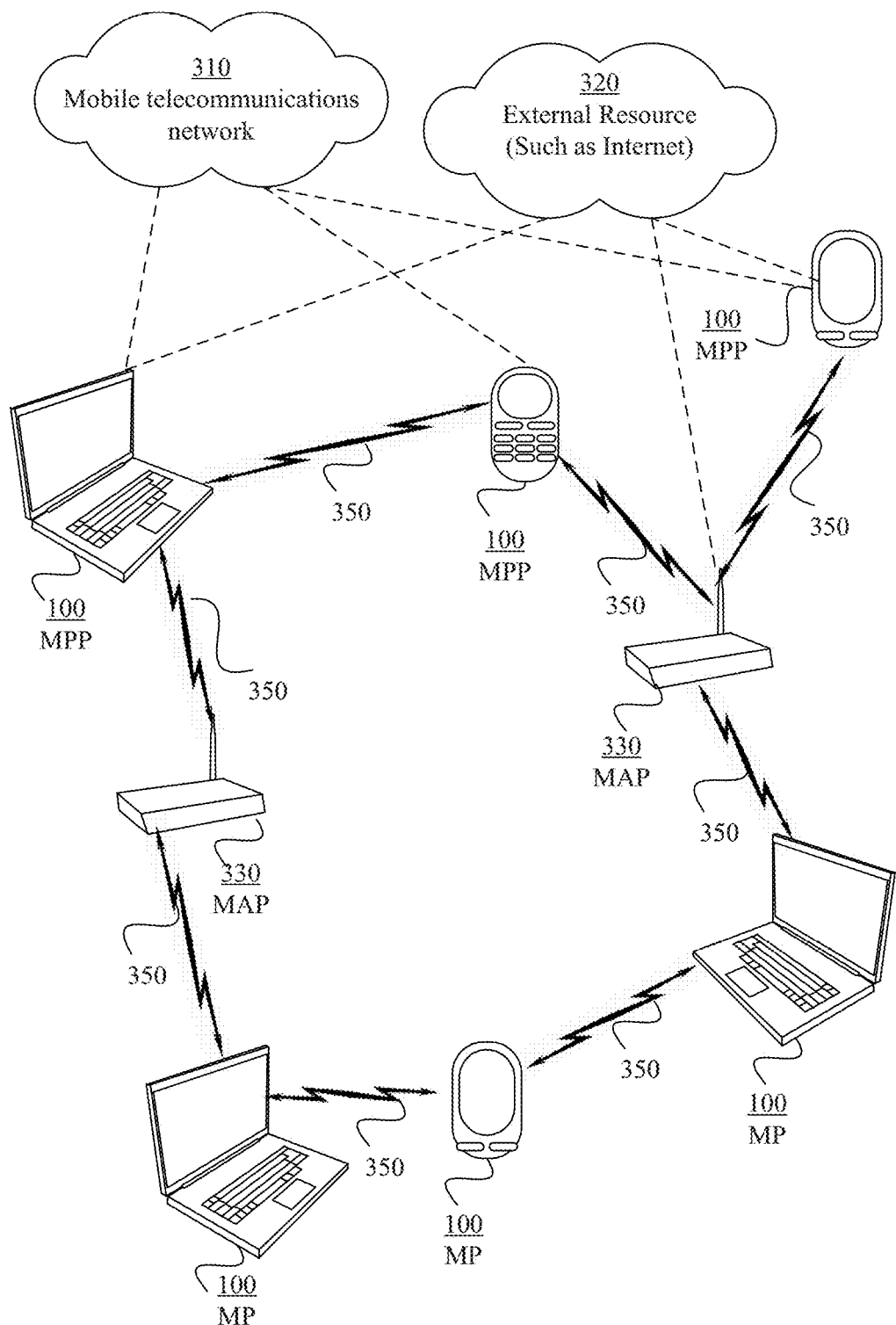
FIG. 3 is a schematic view of a general view of a mesh network according to some embodiments.

FIG. 3 shows a mesh network 300. A mesh network 300 comprises a plurality of nodes which may be a station 100 as in FIGS. 1a, 1b and 2. The mesh network 300 may also comprise at least one access point 330, referred to as a Mesh Access Point (MAP). A network without any access points 330 is called an ad hoc network. A MAP 330 is also an example of a network node. In a mesh network 300 each node 330, 100 is configured to capture and disseminate data that is aimed for the specific node. Each node 330, 100 is also configured to serve as a relay for other nodes 100, that is, the node 100 must collaborate to propagate data in the network 300. The mesh access points 330 are configured to serve as relays and routers for the other nodes 100. The nodes 330, 100 are configured to connect to one another through links or connections 350.

The network shown in FIG. 3 is a wireless mesh network and the stations 100 and the access points 330 (if any) are configured to establish the wireless links 350 for communicating with one another.

In this example, the mesh network is arranged to operate according to the IEEE 802.11 Mesh standard. There are three types of nodes 330, 100 in such a mesh network, namely Mesh Points (MP), Mesh Portal Points (MPP) and Mesh Access Points (MAP).

An MP is often a laptop, smartphone or other wireless device, such as has been disclosed in the above with reference to FIGS. 1a and 1b, and supports a peer protocol for discovering neighboring nodes and maintaining an overview of them. In IEEE 802.11 Mesh this peer protocol is called Peer Link Management protocol.

The discovery process is implemented so that a node transmits a beacon. A beacon is a data package that is transmitted periodically and carries information identifying the node transmitting it. Other data carried in the beacon includes Path Selection Protocol ID, Path Selection metric, Congestion Control Mode, Synchronization Protocol ID, Authentication Protocol ID, Mesh Formation Info and Mesh Capability. Nodes 330, 100 in a mesh network receive this information and each node 330, 100 is thus aware of its surrounding network environment.

The MPs also support a protocol for communicating with other nodes, nodes that are not necessarily neighbors to the MP. In IEEE 802.11 Mesh this peer protocol is called Hybrid Wireless Mesh Protocol (HWMP). It is hybrid because it supports two kinds of path selection protocols. In IEEE 802.11 Mesh the protocols use the MAC addresses for addressing a data package correctly. Each node 330, 100 is configured to find a path from one node 330, 100 to another node 330, 100. This is referred to as path selection.

An MPP is configured to provide gateway functionality to the mesh network. The MPP may for example be a portal to the internet 320 or a communication network 310, such as a mobile telecommunications network. An MPP must thus be configured to bridge at least two interface protocols. An MPP is often a laptop, a cell phone or other wireless device.

A MAP is an access point that is configured to also communicate according to the mesh network standard and to operate as an access point.

In the mesh network 300 of FIG. 3 there are eight nodes 330, 100 whereof three are laptops, three are smartphones and two are routers. Two nodes are MAPs, three nodes are MPs and at least two nodes are MPPs. It should be noted that a node may have the capability to act as both an MP and an MPP. For example, the MPs of the example mesh network of FIG. 3 may actually also be MPPs. For clarity issues, only three nodes are illustrated as having internet capability and three as having capabilities for mobile telecommunication.

A mesh network can be designed using a flooding technique or a routing technique. When using a routing technique, a message propagates from a sending node 100 to receiving node 100 along a path, by hopping from node 100 to node 100 until the receiving node 100 is reached. To ensure that all paths are available, a routing network must allow for continuous connections and reconfiguration around broken or blocked paths, using self-healing algorithms. According to the standard IEEE 802.11 Mesh should a path be broken this will be discovered after a time period (e.g. 5 s) when a sending node detects that reception is not acknowledged. The system then performs a rerouting procedure by sending out path requests (PREM) as has been discussed in the background section.

The self-healing capability enables a routing-based network to operate when one node breaks down or a connection goes bad. As a result, the network is typically quite reliable, as there is often more than one path between a source and a destination in the network. Although mostly used in wireless scenarios, this concept is also applicable to wired networks and software interaction.

A wireless mesh network (WMN) is a communications network made up of radio nodes (laptops, cell phones and other wireless devices) while the mesh routers forward traffic to and from the gateways which may but need not connect to the Internet. The coverage area of the radio nodes working as a single network is sometimes called a mesh cloud. Access to this mesh cloud is dependent on the radio nodes working in harmony with each other to create a radio network. A mesh network is reliable and offers redundancy. When one node can no longer operate, the rest of the nodes can still communicate with each other, directly or through one or more intermediate nodes. Wireless mesh networks can be implemented with various wireless technology including 802.11, 802.15, 802.16, cellular technologies or combinations of more than one type.

A wireless mesh network often has a more planned configuration, and may be deployed to provide dynamic and cost effective connectivity over a certain geographic area. An ad-hoc network, on the other hand, is formed ad hoc when wireless devices come within communication range of each other. The MAPs may be mobile, and be moved according to specific demands arising in the network. Often the MAPs are not limited in terms of resources compared to other nodes in the network and thus can be exploited to perform more resource intensive functions. In this way, the wireless mesh network differs from an ad-hoc network, since these nodes are often constrained by resources.

According to 802.11 Mesh, in a mesh network a path request, PREQ, is sent out periodically with interval T. This ensures that the paths are updated regularly and kept valid in a network environment that otherwise dynamically changes when new stations enter the network and old stations leave, or when the stations move around within the mesh network resulting in a change of network topology.

In order to ensure seamless hand over between paths and avoiding packet loss or delay due to bad paths, the inventors have after insightful reasoning determined a need for keeping a second path table.

An example mesh network is illustrated in FIG. 4. Mesh network 400 comprises 6 different mesh stations 100-O, 100-I1, 100-I2, 100-I3, 100-I4, 100-T, the mesh network and mesh stations may for example correspond to the mesh network and mesh stations as described in conjunction with FIG. 1-3.

Each mesh station 100-O, 100-I1, 100-I2, 100-I3, 100-I4, 100-T comprises two path tables $Tab_1$, $Tab_2$.

If originator station 100-O needs to communicate with target station 100-T, originator station 100-O broadcasts a path request data packet PREQ 1, PREQ 2, PREQ 3 to adjacent stations 100-I1, 100-I2, 100-I3.

Each adjacent station 100-I1, 100-I2, 100-I3, upon receiving the PREQ determines if the PREQ is addressed to itself. If the PREQ is addressed to another station the adjacent station 100-I1, 100-I2, 100-I3 broadcasts the PREQ further so it may reach its destination.

PREQ 1 is relayed through intermediate station 100-I1 to target station 100-T.

PREQ 2 is relayed through intermediate stations 100-I2 and 100-I4 to target station 100-T.

PREQ 3 is relayed through intermediate station 100-I3 and 100-I2 to target station 100-T.

As target station 100-T receives the PREQ from the different paths, it determines that the PREQ is addressed to itself and replies by transmitting by unicast a path reply data packet PREP 1, PREP 2, PREP 3 comprising the path which the PREQ traversed from the originator station 100-O to the target station 100-T. PREP 1, PREP 2 and PREP 2 are transmitted back to the originator station 100-O using the path that was traversed by the respective PREQ (and which path is also comprised in the PREP).

Since the paths, which the respective PREPs are traversing, are of different length, the PREP having the shortest path will arrive at the originator station 100-O before the other PREPs. In the example mesh network 400 PREQ 1 will arrive before PREQ 2 and PREQ 3.

The originator station 100-O receives PREP 1, and stores the path pertaining to it in its second path table $Tab_2$. The originator station then waits for other PREPs to arrive, in this case PREP 2 and PREP 3 during a determined time period.

The second time period may be predetermined by the originator station 100-O, or it may change dynamically depending on the quality of the mesh network. For example, a mesh network where low signal quality is experienced may require that the waiting period is as low as possible, whereas in a mesh network experiencing good signal quality the station may benefit from having a longer waiting period.

Upon receiving PREP 2 and PREP 3, the originator station 100-O may store the respective paths comprised in the PREPs in its second path table $Tab_2$.

In some embodiments, each path comprised in each received second PREP is compared to a first path comprised in the first PREP stored in the second path table $Tab_2$. If it is determined that the path pertaining to the received second PREP is better than the path pertaining to the first PREP, the path of the second PREP overwrites the path of the first PREP in the second path table $Tab_2$.

Before the expiration of the second time period t e.g. at a third time period t1 being less than the second time period t, the originator station 100-O compares the received paths stored in the second path table and determines a best path based on signal parameters. The best path is then copied from the second path table $Tab_2$ to the first path table $Tab_1$. This may be done during the second time period, for example at the expiration of the third time period t1.

In order to determine the best path, several signal parameters may be considered. For example, the signal parameters may pertain to signal strength, Received Signal Strength Indication (RSSI) of a station link, jitter, Signal to Noise (SNR) ratio, etc.

The best path may not necessarily be the shortest path. A problem with the prior art is that upon sending a PREQ from an originator station, the first PREP to arrive back to the originator station is immediately used by the originator station to send data packets to a target station. That is, the first path table is updated directly with the first arrived PREP which thus represents the shortest path.

However, the shortest path may for example experience interference or low signal strength on one or several links, which typically results in a high drop rate of data packets, whereas another longer path experiences good signal quality.

The inventors have realized after insightful reasoning that by issuing a PREQ shortly before the update of the first path table $Tab_1$, e.g. a new PREQ may be issued at every T-t instead of at the end of the time interval T, and by keeping a second path table $Tab_2$, a station that has issued a PREQ may wait a for a certain amount of time, preferably during a third time period t1 which is less than t, for example $t1=t/2$, while gathering returning PREPs. In this way the path comprising the best signal quality may be chosen for data transmission.

The path comprising the best signal quality may be the longest path, however, choosing the longer path typically results in a more stable communication between the originator node and the target node. This leads to less packet loss in the mesh network.

When the originator station 100-O has determined the best path, the best path is copied from the second path table $Tab_2$ to the first path table $Tab_1$ of the originator station at or during the end of the third time period t1. Upon expiration of a time interval T which spans over the second time period t and coincide with the ending of the second time period t, the first table $Tab_1$ is updated.

When the first path table $Tab_1$ is updated, the originator station 100-O may use the best path for transmitting data to the target station 100-T. Then a new cycle is begun where a new PREQ is issued at T-t, paths are gathered in the second path table $Tab_2$ during a time period t1 shorter than the second time period t, e.g. t1 may be equal to t/2t. The best path is determined and moved to the first path table $Tab_1$ at the expiration of t1 and the first path table $Tab_1$ is updated at the expiration of time interval T.

When the best path has been chosen, the intermediate station pertaining to the best path are updated on the path selection and may add to their first tables the best path for sending data packets between originator station 100-O and target station 100-T. This procedure will be described in more detail further on in this disclosure.

FIGS. 5a and 5b illustrates the first and second tables $Tab_1$, $Tab_2$. The first and second tables $Tab_1$, $Tab_2$ may for example be the first and second tables of the originator station 100-O as described in conjunction with FIG. 4.

In FIG. 5a the originator station has received a first path reply PREP 1 comprising a first alternative path to the target station. The first alternative path PATH 1 is stored in the second table $Tab_2$.

The second third time period t1 for receiving path replies has not yet expired, and as a second path reply PREP 2 is received comprising a second alternative path PATH 2 to the target station, the second alternative path is stored in the second table $Tab_2$.

The first alternative path PATH 1 is compared to the second alternative path PATH 2 based on signal parameters in order to establish the best path for transmitting data packets between the originator station and the target station.

If the second alternative path PATH 2 comprises better signal parameters (for example better signal strength or packet quality) than the first alternative path PATH 1, then the second alternative path PATH 2 is determined to be the best path.

Then, the second alternative path PATH 2 overwrites the first alternative path PATH 1 in the second path table.

At the expiration of t1, the best path (in this example, the second alternative path PATH 2) is copied from the second path table $Tab_2$ to the first path table $Tab_1$ which is updated at time interval T.

The best path is stored in the first path table, and used for sending data packets between the originator station and the target station.

FIG. 5b illustrates a first and second path table according to some embodiments. The first and second path table may for example be the same first and second path table comprised in the originator station 100-O as described in conjunction with FIG. 4.

In some embodiments, all paths pertaining to returning PREPs are stored in the second path table $Tab_2$.

In FIG. 5b the originator station receives during a time period t1 a plurality of PREPS comprising a plurality of paths to a target station (for example, the target station 100-T as described in conjunction with FIG. 4), PATH 1-N.

At the end of the time period t1, the paths PATH 1-N stored in the second path table are compared to each other based on signal parameters (the comparison may be carried out as described in conjunction with FIG. 5a) in order to determine the best path.

If it is determined that the first alternative path PATH 1 is the best path, then the first alternative path is copied to the first table.

If it is determined that the second alternative path PATH 2 is the best path, then the second alternative path PATH 2 is copied to the first table.

If any of the remaining paths 3-N is determined to be the best path, then that path is copies to and stored in the first table.

The shortest path is not always the best path. If for example, the mesh network of the originator station is the mesh network 400 as described in conjunction with FIG. 4, then the alternative path comprised within PREP 2 does not represent the shortest path, but may instead represent the most stable path with best signal quality. Using this path thus leads to less dropped packets.

PREP 2 comprising the best path is then copied to the first table $Tab_1$, and used for transmitting data packets to the target station (which may for example be the target station 100-T as described in conjunction with FIG. 4).

FIG. 6 illustrates an example method according to some embodiments. The method 600 may for example be carried out by the originator station 100-O as described in conjunction with FIG. 4.

In 601 of the method 600 the originator station receives a PREP comprising an alternative path to a target station (for example the target station 100-T as described in conjunction with FIG. 4).

In 602, the originator station stores the received PREP comprising the path to the target station in its second table (compare with FIG. 5a).

In 603 it is determined if a time period t1 for receiving path replies has expired. If the time period for receiving path replies has expired (yes-path out of 603), the method continues to 604, where the best path is copied from the second table to the first table (compare with FIG. 5b). Alternatively, the best path is moved from the second table to the first table.

In 605, the best path is used for transmitting data packets between the originator station and the target station.

If, in 603, the time period for receiving path replies has not expired (no-path out of 603), the method returns to 601 of the method 600.

In some embodiments, when the best path has been determined by the originator station, the originator station will transmit a path acknowledgement forward data packet (PANF) by a unicast transmission to the target station through the intermediate node pertaining to the best path (compare to FIG. 4, wherein the PANF would be sent to intermediate station 100-I2).

FIG. 7a illustrates an example method 700a according to some embodiments. In 701a the intermediate station receives the PANF from the originator.

In 702a the intermediate station forwards by unicast the PANF along the best path to the target station (compare with FIG. 4, wherein the PANF would traverse the path through intermediate station 100-I4).

The intermediate station forwards the PANF by unicast to the target station in 702a and then in 703a, the intermediate station moves the best path from its second table to its first table. In 704a the intermediate station uses the best path for transmitting data packets between the originator station and the target station.

The PANF is received by the target station, which updates its own first table with the best path and transmits by unicast a path acknowledgement return data packet (PANR) following the best path back to the originator station.

In some embodiments the intermediate station may update its path table with the best path when it receives the PANR from the target to the originator station. This is illustrated by method 700*b* in FIG. 7*b*.

In 701*b* the intermediate station receives the PANR and forwards it by unicast to the originator station. Then in 703*b* the intermediate station moves the best path from its second path table to its first path table. In 704*b* the best path is used by the intermediate station for transmitting data packets between the originator station and the target station.

Thus all stations along the best path have knowledge of which path is to be used for transmitting data packets between the originator station and the target station.

In some embodiments, the intermediate station refrains from updating its path table until it has both received a PANF from the originator station and the corresponding PANR from the target station as is illustrated by method 700*c* in FIG. 7*c* and as is indicated by the dashed arrow between 702*a* and 703*a* in FIG. 7*a* indicating that the move to the other table does not need to be performed at that stage, but can be postponed to a later stage.

In some embodiments, the intermediate station updates its path table both when it receives a PANF from the originator station and when it receives the corresponding PANR from the target station as is also illustrated by method 700*c* in FIG. 7*c* when taken in combination with method 700*b* of FIG. 7*b*. In 701*c* of the method 700*c* the intermediate station receives a PANF from the target originator station. In 702*c* the intermediate station forwards the PANF by unicast to the target station.

The target station accepts the PANF and answers by sending a PANR to the originator station through the same unicast path the PANF traveled.

In 703*c*, the intermediate station receives the PANR and before transmitting it by unicast to the originator station, moves in 704*c* the best path from its second path table to its first path table. In 705*c* of the method 700*c*, the intermediate station starts using the best path for transmitting data packets between the originator station and the target station.

Either of methods 700*a*, 700*b* and 700*c* may be utilized on their own, or combined with each other.

If for some reason the PANR fails to reach the originator station within a certain time period, the originator station will determine a second best path. In one embodiment, the second best path is determined based on the second table $Tab_2$.

In one embodiment, the second best path is determined by broadcasting a new PREQ in order to find another route.

In a mesh network, if the links are solid and good, the periodic PREQ/PREP may be unnecessary and may instead inhibit the communication in the network. This is typically prominent in large mesh networks, where several station's periodic PREQ/PREPs typically results in large amounts of data traffic. This inhibits the efficiency of the network and typically leads to poor performance and packet loss.

Therefore, there is a need for a network stations and methods that enhance network traffic and user experience.

The inventors have after insightful reasoning discovered that by introducing a Weak Path Indicator (WPI) field, a quantitative value, in data packets to carry and relay information about the quality of the weakest links along the mesh path to the destination mesh station during data transfer, the need for periodic PREQs may be mitigated.

The WPI field may be comprised in any type of data packet, both for control data as well as for application or other user data. The teachings herein relating to the WPI may also be used on its own and is not necessarily combined with the teachings of how to maintain shadow tables of the best path.

Furthermore, the inventors have realized that a non linear path request throttle function further ensures that the destination mesh station does not flood the network with PREQs as a reaction to bad or broken links, while still guaranteeing low delay reaction time to bad or broken links.

In some embodiments the data packets may be equipped with a Weak Path Indicator (WPI) field. The WPI may be a quantitative value.

The WPI carries information pertaining to the weakest links along the mesh path between the originator station and the target station during data transfer.

This function may be based on several parameters such as RSSI of a peer link, packet loss, packet quality, packet error rate, jitter and delay time.

For example, delay time between each link along the mesh path, and/or delay time for the complete path can be quantified for usage in the weak path indication value.

The maximum delay time can be calculated by either determining the traffic behavior live, or by negotiation between the originator station and the target station for a maximum path delay time.

The target station may track the state of quality of the complete mesh path by monitoring the WPI field in all received data packets.

Each received data packet comprises a quantitative WPI value (which also will be referred to herein as a WPI integer).

For example, if the WPI integer is 0, it indicates a good link. A WPI integer of 1 indicates a weak link, a WPI integer of 2 indicated a bad link and a WPI integer of 3 indicates a seriously unreliable link which might break at any time.

The target station keeps a WPI counter for the originator station, wherein the counter is incremented for each received data packet with the WPI integer.

Figure 8:
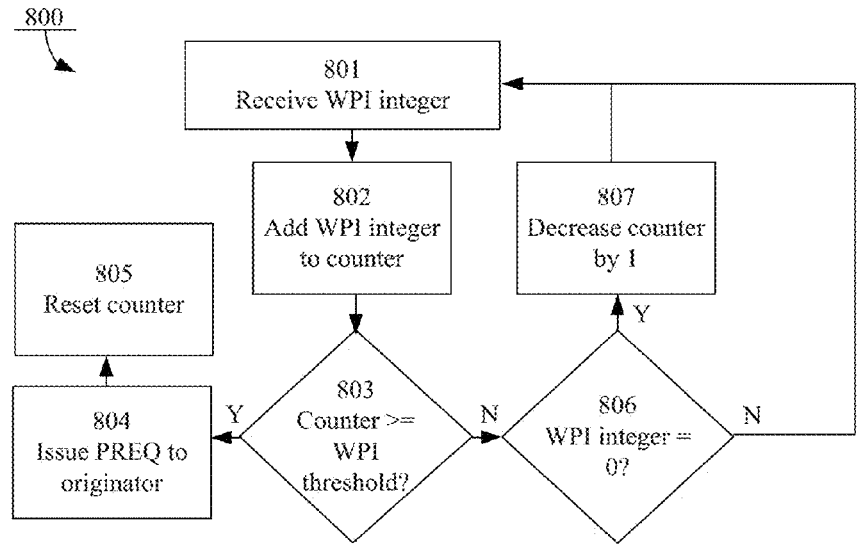
FIG. 8 is a block diagram illustrating an example method according to some embodiments.

In method 800 of FIG. 8, the target station (for example the target station 100-T as described in conjunction with FIG. 4) receives in 801 a data packet comprising a WPI integer.

In 802 the target station adds the WPI integer to the WPI counter.

If, in 803, the WPI counter equals or is greater than a WPI threshold (yes-path out of 803), then in 804 the target station issues a PREQ to the originator station, and the method continues to 805 where the WPI counter is reset.

The WPI threshold may for example be set to 3. A data packet comprising a WPI integer of 3 will then immediately trigger the target station to issue a new PREQ to the originator station so that a new reliable path can be found.

If, in 803, the WPI counter does not equal or is greater than the threshold (no-path out of 803), then in 806 the target station checks if the WPI integer received in the data packet is equal to 0.

If the WPI integer is equal to 0 (yes-path out of 806) the WPI counter of the target station is decreased by one, and the method continues to 801 where a new data packet comprising a WPI integer is received.

If the WPI integer is not equal to 0 (no-path out of 806), the method continues to 801 wherein a new data packet comprising a WPI integer is received.

In some embodiments, when a data packet is traversing a path from an originator station to a target station (for example the originator station 100-O and target station 100-T) as described in conjunction with FIG. 4), it may experience a link between for example the originator station and the first intermediate node (compare with FIG. 4) to be of good quality. The WPI integer is then set to 0. In another link between two adjacent intermediate stations on the path, the link quality may be experienced as weak and the WPI integer will thus be set to 1. If the data packet traverses another link, where the link quality is experienced as bad then the WPI integer will be set to 2.

Thus, the worst link determines how the target station will perceive the quality of the overall path. If one link of the path if deemed to be sufficiently bad (i.e. WPI integer indicates value 3), then the whole path will be replaced. Thus, the path is replaced proactively resulting in less risk of packet loss and problems due to delay. Furthermore, replacing the whole path ensures that all stations along a path always knows which path they belong to and where they should forward the data packets for them to reach the target station.

Furthermore, if the WPI threshold is, for example, set to 3, then two data packets in a row comprising a WPI integer of 2 (or one indicating 1, and another indicating 2) will trigger the target station to issue a new PREQ.

Thus, even if the path is not so bad that it will break immediately the WPI indicates that the path is not in top condition and that the risk of loosing data packet is high. The issued PREQ acts as a precaution for losing data packets by abandoning a path which indicates low performance in favor of a new better path.

If, for some reason, a mesh network experience very low signal quality, it typically results in a majority of the sent data packets indicating a weak or worse path. This could lead to an abundance of issued PREQ which in turn would further congest the network and worsen its overall performance.

The inventors have realized after insightful reasoning that if a PREQ throttle threshold together with a non-non linear path request throttle function is introduced the phenomena of flooding an already poorly performing mesh network with an abundance of PREQs is mitigated.

The non linear path request throttle function ensures that the target station does not flood or congest the network with PREQs.

The flooding may typically happen when several data packets arrives with a WPI integer indicating a weak or worse path during path discovery, or a transient fade out of the signal along the path.

Another reason could typically be that there is only one weak path, in such a case the throttle function will typically increase the time between path requests in a non linear fashion until it reaches a maximum value.

Figure 9:
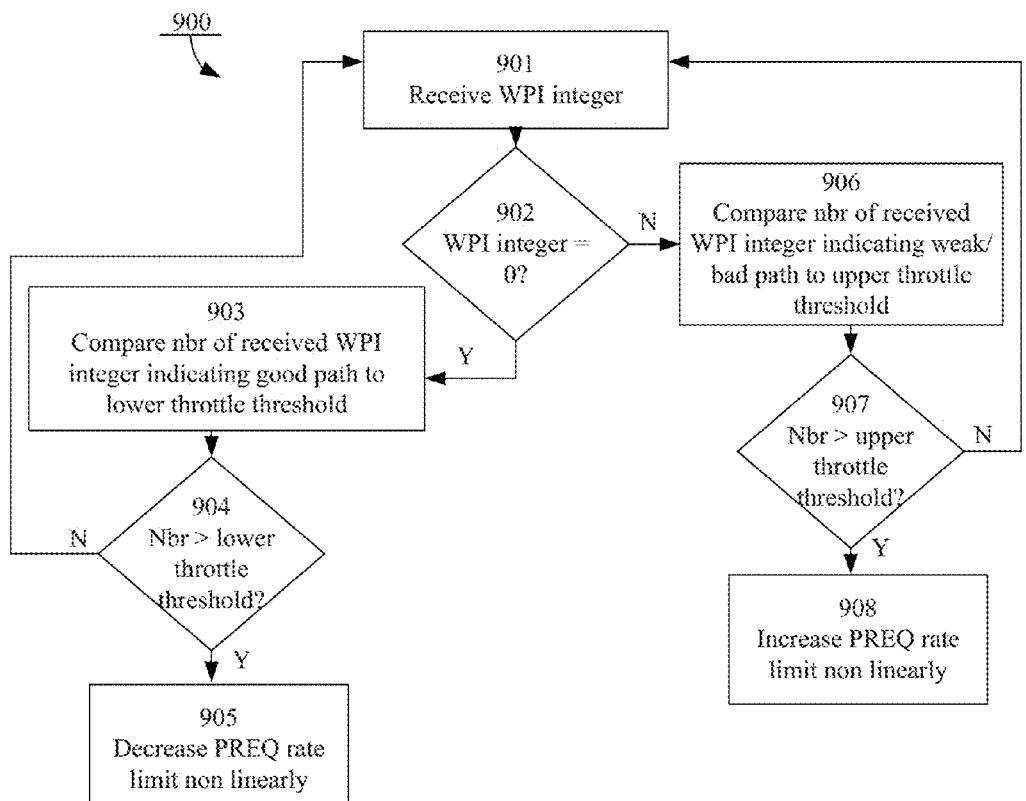
FIG. 9 is a block diagram illustrating an example method according to some embodiments.

In example method 900 of FIG. 9, a target station (for example the target station 100-T as described in conjunction with FIG. 4), receives a data packet (for example a PREQ) comprising a WPI integer (compare with 801 of method 800). In 902 it is checked whether the WPI integer is equal to 0.

If the WPI integer is equal to 0 (yes path out of 902), the method 900 continues to 903 wherein the target station compares the number of received WPI integers indicating a good link to a lower throttle threshold value.

If, in 904, the number of received WPI integers indicating a good link is higher than the lower throttle threshold value (yes-path out of 904), the method continues to 905 wherein the target station decreases the PREQ rate limit non-linearly.

Thus, the amount of time between issued PREQs is initially slowly decreased but will increase non-linearly as more data packets comprising a WPI integer equal to 0 arrive in a close succession. The non linear decrease of the PREQ rate limit down to 0 ensures that the mesh path really is in a good condition before allowing an increased amount of PREQs to be issued.

When the PREQ rate limit has reached 0, a fast response to a changing environment is ensured, which enhances the over all performance of the mesh network.

The PREQ rate limit may be decreased exponentially, or stepwise.

If the number of received WPI integers indicating a good link is not higher than the lower throttle threshold value (no-path out of 904), the method continues to 901, wherein the target station receives a new data packet comprising a WPI integer.

If, in 902, the WPI integer is not equal to 0, then the method 900 continues to 906 where the number of received WPI integers indicating a weak or worse link is compared to an upper throttle threshold value.

If the number of received WPI integers indicating a weak or worse link exceeds the upper throttle threshold value in 907 (yes-path out of 907), then in 908 the PREQ rate limit is increased non linearly.

Thus, the amount of time between each PREQ is rapidly increased if several packets arrives indicating a weak or worse link. This has the benefit that the amount of PREQs is reduced, which enhances the overall performance of the mesh network.

If the number of received WPI integers indicating a weak or worse link does not exceed the upper throttle threshold value in 907 (no-path out of 907), then the method 900 continues to 901 wherein a new data packet comprising a WPI integer is received.

The non-linear path request throttle function ensures that the target station does not flood the network with PREQs. The non-linear path request throttling function will either increase or decrease the PREQ rate limit in a non-linear fashion.

A low rate limit, i.e. PREQs are issued at short time intervals, ensures fast responses to changing environments, which is a typical scenario for a mesh network, and this is the state that a mesh station will find itself in when the link quality has settled.

A high rate limit will, on the other hand, avoid flooding the mesh network with PREQs while trying to find a new and better (based on link quality) end-to-end path.

Thus, the WPI together with the non-linear path request throttle function ensures an optimal level of issued PREQs in a fast changing network environment, such as a mesh network.

The WPI together with the non-linear path request throttle function also mitigates the need for periodic PREQs in the mesh network. Avoiding periodic PREQs typically provides a seamless path soft handover between mesh stations, resulting in a low packet loss and generation of less path maintenance traffic. This typically reduces noise in the wireless environment and therefore supports more stations in a mesh network.

In some embodiments the PREQ rate may only be increased to a predetermined maximum which corresponds to the period path request standard of 802.11 Mesh.

The non linear increase of the PREQ rate limit up to the maximum value ensures that the mesh path really is in an inferior condition before allowing an decreased amount of PREQs to be issued, so that PREQs are not broadcasted when not needed.

When the PREQ rate limit has reached its maximum, the risk of flooding the network while trying to find a new better path is minimized, which enhances the over all performance of the mesh network.

The PREQ rate limit may be increased exponentially, or stepwise.

Figure 10:
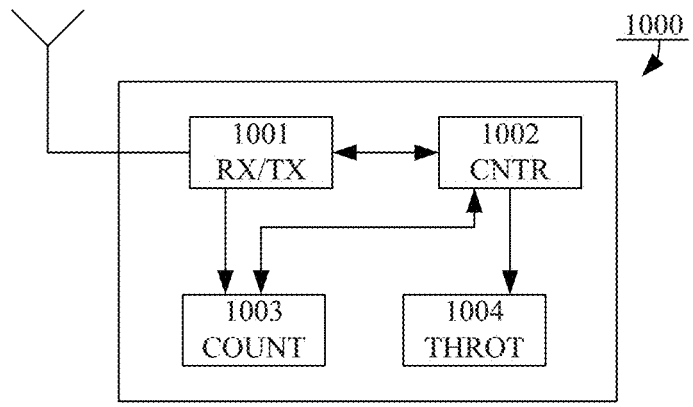
FIG. 10 is a schematic view of the components of a station according to some embodiments.

An example arrangement 1000 of a mesh network station (for example any of the stations as described in conjunction with FIGS. 1, 2, 3, 4) according to some embodiments is illustrated in FIG. 10.

The example arrangement 1000 comprises a transceiver 1001 (RX/TX), a controller 1002 (CNTR), a counter 1003 (COUNT) and a throttling device 1004 (THROT).

In some embodiments the transceiver 1001 (RX/TX) is a receiver separated from a sender.

The transceiver 1001 (RX/TX) is configured to receive data packets, for example path request data packets. For example, the transceiver 1001 (RX/TX) may receive data packets as described in conjunction with FIGS. 6-9 (compare with 601, 701, 703, 801 and 901).

The transceiver 1001 (RX/TX) may relay the received data packet the controller 1002 (CNTR). The controller 1002 (CNTR) is further configured to extract the first path comprised in the first data packet (if the data packet is a PREQ or PREP), and store it in a second path table (compare to FIG. 5*a*).

The controller 1002 (CNTR) is further configured to compare during a time period t each received second path with the first path that is stored in the second path table based on signal parameter. The controller 1002 (CNTR) determines if a newly received second path is better than the first path stored in the second path table by comparing signal parameters pertaining to respective path.

If the second path comprises better signal parameters, indicating a stronger path, the second path will be stored in the second path table and replace the first path.

At the end of the time period t, the controller 1002 (CNTR) is configured to move the best path from the second table, and store it in the first table (compare with 604 of method 600).

In some embodiments, both the first and the second paths are stored in the second table (compare with FIG. 5*b*) during the time period t.

The example arrangement 1000 also comprises a counter 1003 (COUNT) which may for example comprise the WPI counter as described in connection with FIG. 8. The counter 1003 (COUNT) may also comprise one or more means for counting and storing the number of data packets received indicating a good path or a weak or worse path (not shown).

The counter 1003 (COUNT) is further configured to add the WPI integer comprised in the received data packet and increment the one or more means for counting and storing the number of WPI integers received indicating a good path or a weak or worse path by 1.

For example if a data packet is received wherein the WPI integer indicates 2, then 2 is added to the WPI counter and the one or more means for counting and storing the number of WPI integers received indicating a weak or worse path is incremented by 1.

The counter 1003 (COUNT) then relays the WPI counter value and the WPI integer to the controller 1002 (CNTR). The controller 1002 (CNTR) determines if the WPI counter is equal to or has exceeded a WPI threshold value (compare with 803 of method 800).

If it is determined that the WPI counter is equal to or greater than the WPI threshold value (compare with 804 of method 800), the controller 1002 (CNTR) is further configured to issue a new PREQ to the station from which the received data packets originates (for example, originator station 100-O of FIG. 4) by using transceiver 1001 (TX/RX).

The controller 1002 (CNTR) then resets the WPI counter comprised in the counter 1003 (COUNT) to 0.

If it is determined that the WPI counter is not equal to or greater than the WPI threshold value, and that the WPI integer is equal to zero (compare with 806 of method 800), then the controller 1002 (CNTR) is configured to decrease the WPI counter by 1 (compare to 807 of method 800).

The counter 1003 (COUNT) also relays the number of data packets received indicating a good and/or a weak or worse link to the controller 1002 (CNTR).

The controller 1002 (CNTR) determines if the WPI integer is equal to 0 (compare with 902 of method 900). If the WPI integer is equal to zero, the controller 1000 (CNTR) compares the number of received WPI integers indicating a good path to a lower throttle threshold (compare with 903 of method 900).

If the number of received WPI integers indicating a good path exceeds the lower throttle threshold (compare to 904 of method 900), the controller 1002 (CNTR) instructs throttling device 1004 (THROT) to decrease the PREQ rate limit in a non linear fashion (compare with 905 of the method 900).

For example, for each additional WPI integer indicating a good path that is received, the rate at which PREQs are issued will increase exponentially.

If it is determined by the controller 1002 (CNTR) that the WPI integer is not equal to 0, then the controller 1002 (CNTR) will compare the number of received WPI integers indicating a weak or worse path to an upper throttling threshold (compare with 906 of method 900).

If it is determined that the number of received WPI integers indicating a weak or worse path exceeds the upper throttle threshold (compare with 907 of method 900), then the controller 1002 (CNTR) will instruct the throttling device 1004 (THROT) to increase the PREQ rate limit in a non linear fashion (compare with 908 of method 900).

For example, for each additional WPI integer indicating a weak or worse path that is received, the rate at which PREQs are issued will decrease exponentially.

Figure 11:
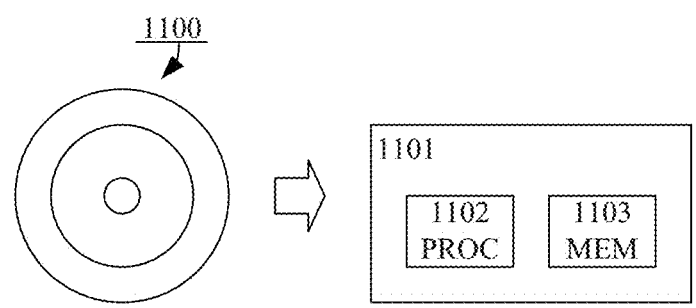
FIG. 11 is a schematic view of a computer program product.

FIG. 11 illustrates a computer program product 1100 according to some embodiments comprising a computer readable medium such as, for example, a diskette or a CD-ROM.

The computer readable medium may have stored thereon a computer program comprising program instructions. The computer program may be loadable into a data-processing unit 1101, which may, for example, be comprised in a mobile terminal. When loaded into the data-processing unit, the computer program may be stored in a memory 1103 (MEM) associated with or integral to the data-processing unit. According to some embodiments, the computer program may, when loaded into and run by the data-processing unit, cause the data-processing 1102 (PROC) unit to execute method steps according to, for example, the methods shown in any of the FIGS. 6, 7, 8, 9.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A mesh network comprising an originator station and a target station wherein each station comprises a controller and memory for storing a first path table for storing one or more paths to be used for sending data packets and a second path table for storing one or more alternative paths for sending data packets, wherein the originator station is configured to:
   broadcast a path request data packet for the target station;
   receive a first path reply data packet comprising a first alternative path to the target station;
   store the first alternative path in the second path table of the originator station;
   receive at least one second path reply data packet comprising at least one second alternative path to the target station;
   retrieve a best path, based on one or more signal parameters pertaining to each path, to the target station from the second path table of the originator station;
   store the best path to the target station in the first path table of the originator station; and
   use the best path for sending data packets to the target station,
   wherein the originator station is further configured to:
   transmit a path acknowledgement forward data packet by unicast via the best path to the target station;
   receive a path acknowledgement return data packet by unicast via the best path to the target station; and
   use the best path according to the first path table for sending data packets to the target station,
   wherein an intermediate station pertaining to the best path to the target station is further configured to:
   receive the path acknowledgement forward data packet;
   forward by unicast the path acknowledgement forward data packet to the target station;
   receive the path acknowledgement return data packet from the target station;
   update the first path table of the intermediate station to comprise the best path to the target station;
   forward the path acknowledgement return data packet to the originator station; and
   use the best path stored in the first path table of the intermediate station to transmit data packets between the originator station and the target station.

2. The mesh network according to claim 1, wherein the best path is determined by comparing the one or more signal parameters of the received second alternative path to the one or more signal parameters of the stored first alternative path to determine the best alternative path and if the second alternative path is determined to be the best alternative path, storing the second alternative path in the second path table overwriting the first alternative path.

3. The mesh network according to claim 1, wherein said controller is further configured to
   store the at least one second alternative path to the target station in the second path table without overwriting the first alternative path; and wherein
   the best path is retrieved by comparing the one or more signal parameters of the stored second alternative path to the one or more signal parameters of the stored first alternative path to determine the best alternative path and if the second alternative path is determined to be the best alternative path, retrieve the second alternative path from the second path table, and if not retrieve the first alternative path.

4. The mesh network according to claim 2, wherein the one or more signal parameters is taken from a group comprising signal to noise ratio, Received Signal Strength Indicator (RSSI) for peer mesh station, path delay time, packet loss and/or packet error rate.

5. The mesh network according to claim 1, wherein the intermediate station comprises a first intermediate station and a second intermediate station,
   wherein the originator station is further configured to
   receive the first path reply data packet comprising a first alternative path to the target station via the first intermediate station;
   store the first alternative path to the target station in the second path table of the originator station;
   receive the second path reply data packet comprising a second alternative path to the target station via the second intermediate station;
   store the second alternative path to the target station in the second path table of the originator station;
   retrieve a best path for sending data packets, based on one or more signal parameters pertaining to each path, to the target station from the second path table of the originator station;
   store the best path for sending data packets to the target station in the first path table of the originator station; and
   use the best path for sending data packets to the target station.

6. The mesh network according to claim 1, wherein the first path table of the originator station is updated at least once during a first time period (T), and wherein the first and the second path request data packets are received and consequently where the second path table of the originator station is updated at least once during a second time period (t) at the end of and partly overlapping the first time period (T).

7. The mesh network according to claim 6, wherein the first time period (T) is 5 seconds, and wherein the second time period (t) is 1 second.

8. The mesh network according to claim 6, wherein the best paths are determined at the end of the first time period and then stored in the first path table.

9. The mesh network according to claim 6, wherein if during the first time period, before the second time period is initiated a path to be used to the target station is broken, the originator station is further configured to:
   broadcast a second path request data packet for the target station.

10. The mesh network according to claim 1, wherein the path request data packet comprises a weak path indicator for indicating the condition of a link between two stations which the path request data packet transverse on its way from the originator station to the target station; wherein the target station comprises a weak path indicator counter for evaluating if the path used by the path request data packet to reach the target station is suitable for the path reply data packet or if a second path request data packet should be issued from the target station to the originator station; and wherein the controller of the target station comprises a throttling element for throttling or increasing the path request data packet rate.

11. The mesh network according to claim 10 wherein the controller of the target station is further configured to compare the number of received weak path indicators indicating an integer greater than 1 to an upper throttle threshold value, if the number of received weak path indicators indicating an integer greater than 1 exceeds the upper threshold value, the controller is further configured to increase the path request data packet rate in a non-linear fashion; and if the number of received weak path indicators indicating an integer greater than 1 is less than a lower throttle threshold value, the controller of the target station is further configured to decrease the path request data packet rate in a non-linear fashion.

12. The mesh network according to claim 11, wherein the non-linear fashion is exponential.

13. The mesh network according to claim 11, wherein the non-linear fashion is stepwise.

14. The mesh network according to claim 10, wherein the weak path indicator indicates integers from 0-3, wherein 0 indicates a good path, 1 indicates a weak path, 2 indicates a bad path and 3 indicates an unreliable path; and wherein for each received path request data packet:

if the integer pertaining to the weak path indicator of the received path request data packet is greater than 0, the weak path indicator counter of the target station is incremented with an integer number corresponding to the integer pertaining to the weak path indicator of the received path request data packet.

15. The mesh network according to claim 14, wherein if the integer pertaining to the weak path indicator of the received path request data packet is equal to 0, the weak path indicator counter is decreased with 1.

16. The mesh network according to claim 14, wherein a threshold value is set for the weak path indicator counter of the target station and if the threshold value is exceeded the target station triggers a path request data packet to the originator station and the weak path indicator counter is reset to 0.

17. A mesh network station being an originator station comprising a controller and a memory for storing a first path table for storing one or more paths to be used for sending data packets, a second path table for storing one or more alternative paths for sending data packets, and wherein the originator station is configured to:

broadcast a first path request data packet for the target station;

receive a first path reply data packet comprising a first alternative path to the target station via a first intermediate station;

store the first alternative path to the target station in the second path table of the originator station;

receive at least one second path reply data packet comprising at least one second alternative path to the target station via a second intermediate station;

store the second alternative path to the target station in the second path table of the originator station;

retrieve a best path, based on one or more signal parameters pertaining to each path, to the target station from the second path table of the originator station;

store the best path to the target station in the first path table of the originator station; and wherein the originator station is further configured to:

transmit a path acknowledge forward data packet by unicast via the intermediate station pertaining to the best path to the target station;

receive a path acknowledge return data packet by unicast via the intermediate station pertaining to the best path from the target station; and use the best path for sending data packets to the target station.

18. A method of a mesh network station in a mesh network comprising an originator station and a target station wherein each station comprises a controller and a memory for storing a first path table for storing one or more paths for sending data packets and a second path table for storing one or more alternative paths for sending data; wherein the method comprises broadcasting by the originator station a first path request data packet for the target station;

receiving a first path reply data packet comprising a first alternative path to the target station;

storing the first alternative route in the second path table of the originator station;

receiving at least one second path reply data packet comprising at least one second alternative path to the target station;

retrieving a best path, based on one or more signal parameters pertaining to each path, to the target station from the second path table of the originator station;

storing the best path to the target station in the first path table of the originator station; and using the best path for sending data packets to the target station, wherein the method further comprises:

transmitting, by the originator station, a path acknowledgement forward data packet by unicast via the best path to the target station;

receiving, by the originator station, a path acknowledgement return data packet by unicast via the best path to the target station; and using the best path according to the first path table for sending data packets to the target station, wherein the method further comprises:

receiving, by an intermediate station pertaining to the best path, the path acknowledgement forward data packet;

forwarding, by the intermediate station, by unicast the path acknowledgement forward data packet to the target station;

receiving, by the intermediate station, the path acknowledgement return data packet from the target station;

updating the first path table of the intermediate station to comprise the best path to the target station;

forwarding, by the intermediate station, the path acknowledgement return data packet to the originator station; and using the best path stored in the first path table of the intermediate station to transmit data packets between the originator station and the target station.

19. A non-transitory computer readable medium, having thereon a computer program comprising program instructions that, when executed by a computing device, cause the computing device to perform the method according to claim 18.

* * * * *